(12) United States Patent
Miemiec (10) Patent No.: US 7,896,937 B2
(45) Date of Patent: Mar. 1, 2011

(54) HYBRID SEPARATOR

(75) Inventor: Lorraine S. Miemiec, Hebron, CT (US)

(73) Assignee: ALSTOM Technology Ltd, Baden (CH)

( * ) Notice: Subject to any disclaimer, the term of this patent is extended or adjusted under 35 U.S.C. 154(b) by 330 days.

(21) Appl. No.: 12/127,846

(22) Filed: May 28, 2008

(65) Prior Publication Data

US 2009/0205489 A1 Aug. 20, 2009

Related U.S. Application Data

(60) Provisional application No. 61/029,391, filed on Feb. 18, 2008.

(51) Int. Cl.
*B01D 50/00* (2006.01)

(52) U.S. Cl. .............................. 55/337; 55/440; 55/441; 55/442; 55/443; 55/444; 55/356; 55/357; 55/342; 55/487; 55/456; 55/457; 55/DIG. 23; 95/268; 95/35; 96/392

(58) Field of Classification Search ............... 55/337, 55/440, 442–444, 356, 357, DIG. 23, 486, 55/487, 342; 95/268, 35; 96/392
See application file for complete search history.

(56) References Cited

U.S. PATENT DOCUMENTS

| 2,594,490 | A |   | 4/1952 | Patterson |
| 2,891,632 | A | * | 6/1959 | Coulter ........................ 55/442 |
| 3,165,387 | A | * | 1/1965 | Place .......................... 95/211 |
| 3,216,182 | A |   | 11/1965 | Cochran et al. |
| 3,386,230 | A | * | 6/1968 | Riesberg et al. ............... 55/337 |
| 4,516,994 | A | * | 5/1985 | Kocher ........................ 55/337 |
| 4,602,925 | A |   | 7/1986 | Huffman |
| 4,702,893 | A | * | 10/1987 | Kirk et al. .................... 422/173 |
| 5,271,753 | A | * | 12/1993 | Akel et al. .................... 55/436 |
| 5,320,652 | A | * | 6/1994 | Akel et al. .................... 55/320 |
| 5,385,592 | A | * | 1/1995 | Maeda ......................... 55/323 |
| 7,156,889 | B1 | * | 1/2007 | Swanson et al. ............... 55/337 |
| 2006/0168921 | A1 | * | 8/2006 | Cheng ......................... 55/337 |
| 2007/0240390 | A1 | * | 10/2007 | Becker et al. ................. 55/423 |
| 2008/0006011 | A1 | * | 1/2008 | Larnholm et al. ............. 55/421 |
| 2008/0110140 | A1 | * | 5/2008 | Egger .......................... 55/337 |
| 2009/0139403 | A1 | * | 6/2009 | Darke et al. .................. 95/268 |

FOREIGN PATENT DOCUMENTS

| EP | 0 048 508 | 3/1982 |
| EP | 1 745 833 | 1/2007 |

OTHER PUBLICATIONS

PCT International Search Report and the Written Opinion of the International Searching Authority, dated Nov. 5, 2010—(PCT/US2009/032353).

* cited by examiner

*Primary Examiner*—Jason M Greene
*Assistant Examiner*—Dung Bui
(74) *Attorney, Agent, or Firm*—Lawrence P. Zale (57) ABSTRACT

A low-profile vapor-liquid separator, such as a steam-water separator is described having an inlet opening for receiving a flow of a vapor-liquid mixture and an outlet opening for exhausting the flow of a vapor-liquid mixture after removal of the liquid. A passageway that extending longitudinally between the inlet opening and the outlet opening has a plurality of spinner blades that rotate the liquid to a slot in the wall for removal. The separator has an unobstructed passageway with few slots that increases rotation and centrifugal separation. Due to its efficiency it may be made much smaller than predecessor separators.

20 Claims, 3 Drawing Sheets

HYBRID SEPARATOR

CROSS-REFERENCE TO RELATED PATENT APPLICATION

This application claims the benefit of U.S. Provisional Patent Application No. 61/029,391 filed Feb. 18, 2008, which is incorporated herein by reference in its entirety.

RELATED APPLICATIONS

The present application is related to U.S. patent application Ser. No. 089,888, filed Jul. 12, 1993 and entitled "Steam Separating Apparatus" (now U.S. Pat. No. 5,320,652, which issued on Jun. 14, 1994), the disclosure of which is incorporated herein in its entirety by this reference thereto.

FIELD OF THE INVENTION

The present invention relates generally to the separation of multi-phase fluid mixtures, and more specifically to the separation of vapors from liquids in two-phase fluid mixtures, such as the separation of steam from water or the separation of natural gas from liquid hydrocarbons.

BACKGROUND OF THE INVENTION

In accordance with the conventional mode of operation of pressured steam drum type steam generating systems, water in water tubes, the latter commonly being referred to as risers, is heated in order to thereby generate a two-phase mixture of steam and water. This two-phase mixture is then made to flow from such risers to a steam drum. Continuing, the steam that enters such a steam drum is designed to be intimately mixed with large and possibly variable amounts of water.

Installed within such a steam drum are separators and other devices that are designed to be operative to effect therewith the separation of such steam from such water, prior to such steam being made to leave such steam drum and being made to enter a superheater. To this end, in addition to such separators, such a steam drum commonly may embody internal baffles that are designed to be operative for purposes of effecting therewith a change in the direction of flow of such steam and water mixture, as well as impellers and/or moisture coalescers such as, by way of exemplification, screen and corrugated plate final dryers. Such separators and such other devices often are used singly, but more commonly are employed in consort in order to thereby effect therewith the separation and purification of such steam, so that most, if not all, of the impurities that may be entrained in such steam are thus removed from such steam before the latter is made to leave such a steam drum.

It is necessary that such separators and such other devices be designed with various factors in mind. For example, such separation and such purification must be performed therewith within a matter of seconds and under a variety of different operating condition. To this end, such a steam/water mixture may be flowing at any of a variety of different velocities and/or may be at any of a variety of different pressures. In addition, the pressure drop across such separators and such other devices should be kept relatively low in order to thereby minimize the effect such separators and such other devices have on the circulation of the water through the steam generating system and/or on the water level controls of the steam generating system.

Continually, also the space that is required in order to thereby accommodate such separators and such other devices in such a steam drum for purposes of effecting therewith the separation of and the purification of such steam in such a steam drum must be taken into account in determining the sizing of such a steam drum. To this end, the diameter and the length of such a steam drum must necessarily be made to be sufficient in order to thereby provide accessibility for purposes of effecting the installation as well as permitting inspection of such separators and such other devices, and to also provide for the processing of the maximum flows of water and steam therethrough. Indeed, designing such a steam drum such that the latter has sufficient drum diameter and length in order to thereby provide such accessibility, while still providing such a steam drum that embodies a reasonable size has at times proven to be a significant challenge.

It is also well recognized by those skilled in the art that water in such steam-water mixture frequently contains dissolved and suspended salts. Thus, any water that is not separated from such steam-water mixture will also include such dissolved and suspended salts, which will appear as a solids impurity in such steam. If such water remains combined with such steam leaving such a steam drum, when the moisture, i.e., such water, is evaporated in the superheater, such solids impurity will remain in the superheated steam that is made to flow to a turbine or to such other steam driven apparatus. To this end, such steam having such a solids impurity entrained therewith can have a detrimental effect on the operation and service life of such a turbine or such other steam driven apparatus.

One exemplary innovative technique for effecting the separation of water from steam in the steam drum of a steam generating system is disclosed in U.S. Pat. No. 5,320,652, all rights to which are assigned to the same assignee as are all of the rights in the present patent application, which is incorporated herein by reference in its entirety. Continuing, the '652 U.S. patent discloses an improved separator that can be installed within a relatively small amount of space in the steam drum of a steam generating system, such as to be operative to quickly effect the removal therewith of substantial quantities of water from a mixture of steam-water that is flowing through the steam drum of such a steam generating system with a relatively low-pressure loss. The separator that is disclosed in the '652 U.S. patent is deemed to comprise a substantial improvement over the conventional separator technology that existed at that time, although the separator technology to which the '652 U.S. patent is directed has not been widely implemented since the issuance of the '652 U.S. patent. Rather, another somewhat simplified, but highly reliable, separator technology is the one that remains in wide use even today. This widely used separator is sometimes referred to by those skilled in the art as a standard separator. Such a standard separator embodies a core as well as a limited number of spinner blades, e.g., 4 spinner blades, and lacks the diffuser section and other superstructure that the '652 U.S. patent embodies wherein such diffuser section and such other superstructure are suitably located above the housing 28 of the separator that is described and illustrated in the '652 U.S. patent. Such a standard separator has now served the industry well for many years.

However, a need still exist for a new and improved separator technology that would be operative to facilitate the more efficient or the more effective removal of a liquid from a vapor, such as the removal of water from steam, and that could be implemented through the use of a separator without the need for employing the relatively complex superstructure that is required by the separator technology that is described and illustrated in the '652 U.S. patent.

OBJECTS OF THE INVENTION

Accordingly, it is an objective of the present invention to provide a new and improved separator technology that is operative for purposes of effecting therewith the separation of vapors from liquids that are entrained in two-phase fluid mixtures.

It is another object of the present invention to provide such a new and improved separation technology that is suitable for use for purposes of effecting therewith the separation of steam from water in the steam drum of a steam generating system.

Additional objects, advantages, and novel features of the present invention will become readily apparent to those skilled in the art from the disclosure thereof in this patent application, including the detailed description thereof herein that follows, as well as by practice of the present invention. While the present invention is described in more detail hereinafter with reference to a preferred embodiment(s) thereof, it will be readily understood that the present invention is not limited thereto. To this end, those of ordinary skill in this art having access to the teachings contained herein will recognize that there are additional implementations, modifications, and embodiments, as well as other fields of use thereof, which fall without departing from the essence of the present invention within the scope of the present invention as the latter is disclosed, illustrated and claimed herein and with respect to which the present invention could be of significant utility.

SUMMARY OF THE INVENTION

In accordance with the present invention, a separation technology is provided that is designed to be operative for purposes of effecting therewith the separation of a liquid from a vapor-liquid mixture that is flowing in a passageway, is the latter being defined by a peripheral wall having a through slot formed therein. Continuing with the description thereof, a flow of a vapor-liquid mixture is received at the inlet of such a passageway. In addition, a centrifugal force is designed to be applied in order to thereby cause droplets of the liquid that is contained in such vapor-liquid mixture to flow through the slot that is formed in the peripheral wall, whereupon such now vapor-reduced liquid mixture flow is then exhausted from the outlet with which such a passageway is suitably provided. To this end, the separation technology of the present invention is particularly suited for use for purposes of effecting therewith the separation of water from a steam-water mixture in the steam drum of a steam generating system.

Preferably, in accordance with the present invention the droplets that are caused to flow through the slot that is suitably formed in the peripheral wall are screened, e.g., are filtered, at least once. More preferably, at least a portion of such droplets, which are subjected to an initial screening, are once again screened, and then at least a portion of such droplets, which have once again been subjected to screening, are screened still again.

In accordance with a practical implementation of the present invention, there is provided a vapor-liquid separator in which there is embodied both a chamber, which could be in the form of a cylindrical pipe, and a plurality of spinner blades. Such a chamber embodies both an inlet opening that is designed to be operative for purposes of receiving thereat a flow of a vapor-liquid mixture and an outlet opening that is designed to be operative for purposes of exhausting therethrough a vapor-reduced liquid mixture. Continuing with the description thereof, such a chamber also is provided with a wall, and the inner surface of such a wall is operative to define a passageway that extends longitudinally between said inlet opening and said outlet opening. Also, in accordance with the present invention, a slot is formed through the inner surface and the outer surface of such a wall. Such a slot may be made to extend along the circumference of such a wall, and preferably in accordance with the preferred embodiment of the present invention comprises one of a series of adjacent slots that are suitably formed through the inner surface and outer surface of such a wall of such a chamber.

With further reference thereto, the plurality of such spinner blades are suitably disposed within such a passageway so as to thereby be located below such a slot. Continuing, in accordance with the present invention such spinner blades preferably are suitably configured, i.e. suitably shaped and sized, in order to thereby be operative to induce the vapor-liquid mixture flow that is made to flow thereto to spin, and preferably so that such spinning occurs about the longitudinal axis of such a passageway. Such spinning in turn is designed to be operative to centrifugally cause the droplets of liquid that are entrained in the vapor-liquid mixture flow that is being subjected to spinning to flow up against the inner surface of such a wall and through such a slot. The plurality of such spinner blades are suitably disposed in accordance with the present invention so as to be located approximately midway between the inlet opening of such a wall of such a chamber and the outlet opening of such a wall of such a chamber, although other arrangements thereof could equally well be employed without departing from the essence of the present invention. In accordance with the preferred embodiment of the present invention, the number of such spinner blades preferably exceeds 4 in number, although a greater or a lesser number of spinner blades could equally well be employed without departing from the essence of the present invention. In one exemplary implementation of the present invention, 10 such spinner blades were found to work very well. However, it will be readily recognized by those skilled in this art that the number and configuration of such spinner blades will vary depending on the nature of the particular application in which it is desired to utilize the separation technology of the present invention. It will also be readily recognized by those skilled in this art that techniques for effecting therewith the configuration of such spinner blades for use in an individual application are well known and that such techniques are routinely applied for purposes of suitably configuring such spinner blades for use in a desired application thereof. Such a passageway is suitably configured, i.e., suitably sized and shaped, so as to be operative to cause the vapor-reduced liquid mixture flow that is subjected to spinning to flow to the outlet opening that is provided in such a wall of such a chamber.

Advantageously, in accordance with the preferred embodiment of the present invention a mesh, such as a No. 8 mesh metal screen, is suitably located outside such a chamber so as to be disposed in the path of the droplets that are made to flow through such a slot. If such a mesh is so provided, such a mesh preferably embodies a mesh wall that is designed to be operative to define a compartment, which extends longitudinally between the two ends of such a mesh, and such a chamber is suitably designed so as to be disposed within such a compartment. Continuing, the longitudinal axis of such a passageway may also function as the longitudinal axis of such a compartment, although this deemed to be optional insofar as the mode of operation of the present invention is concerned. More preferably, such a mesh will have a crease formed therein that extends in a plane that is substantially orthogonal to the longitudinal axis of such a passageway. To this end, such a mesh could be accordion shaped in the longitudinal direction thereof.

Another, i.e., or a second mesh, such as a 6 Gage mesh metal screen, may also without departing from the essence of the present invention be located outside such a chamber so that such a second mesh is suitably disposed in the path of the droplets that are made to flow through such a mesh to which reference has been made in the preceding paragraph, the latter mesh sometimes being referred to hereinafter as the first mesh. If such a second mesh is so provided, it is preferred that such a second mesh have a mesh wall that is operative to define another, i.e., or a second compartment that is designed to extend longitudinally between the two ends of such a second mesh, and so that such a first mesh is suitably disposed within such a second compartment. The longitudinal axis of such a passageway may also function as the longitudinal axis of such a second compartment.

A third mesh, such as a 0.5 inch by No. 13 expanded metal screen, may without departing from the essence of the present invention additionally be suitably located outside such a chamber. Such a third mesh is designed to be disposed in the path of the droplets that are made to flow through such a second mesh. If such a third mesh is so provided, it is preferred that such a third mesh have a mesh wall that is operative to define a third compartment that is designed to extend longitudinally between the two ends of such a third mesh, and so that such a second mesh is suitably disposed within such a third compartment. In this case also, the longitudinal axis of such a passageway may also function as the longitudinal axis of such a third compartment.

ENABLING DESCRIPTION OF A PREFERRED EMBODIMENT(S)

Figure 1:
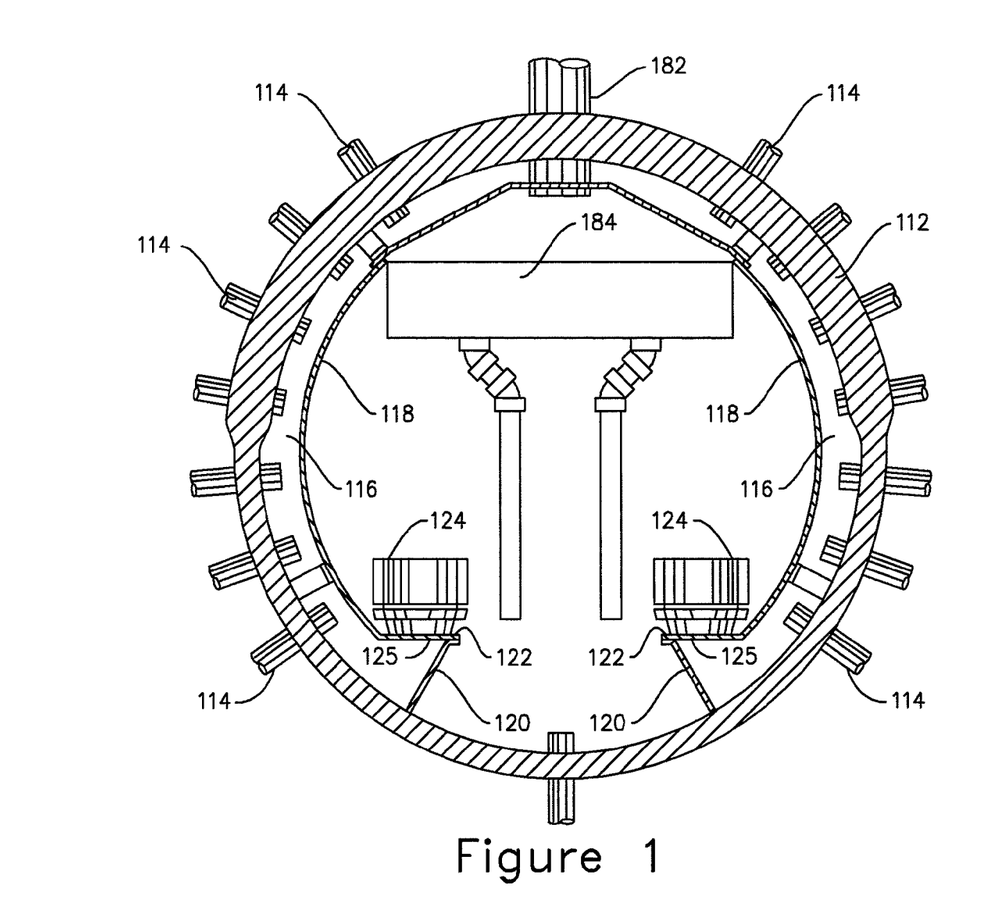
FIG. 1 is a cross sectional view of a steam drum incorporating separators, constructed in accordance with the present invention.

Referring specifically to FIG. 1 of the drawings, the drum 112 that is illustrated therein embodies a conventional steam drum configuration such as to thus have an elongated cylindrical shape and so as to be disposed with the axis thereof being parallel to the horizontal. Continuing with the description thereof, the drum 112 is suitably penetrated by riser pipes 114 through which is made to flow the steam/water mixture that is received thereby from the steam generator, and from which this steam/water mixture is discharged into the annular space 116 that exists between the drum liner or baffle 118 and the drum 112. Although the riser pipes 114 are illustrated in FIG. 1 of the drawings as being distributed rather uniformly around the annular space 116, the actual sections of the drum 112 that are penetrated by such riser pipes 114 is a variable that is dependent on all of the following: the drum operating pressure, the type of furnace circulation, and the mass loading of steam and water into the drum 112. The baffle 118, which is closed off at the bottom ends thereof by the baffle portions 120, includes the horizontal ledge portions 122. With further reference thereto, the baffle 118 including the portions 120 and 122 thereof is designed so as to suitably extend the full length of the drum 112 such that the enclosed annular space 116 is thus provided thereby.

Continuing, mounted on the baffle ledge portions 122 are a plurality of steam separating units 124 that are preferably suitably positioned in two horizontally extending rows on either side of the axis of the drum. Although two such horizontally extending rows have been illustrated in FIG. 1 of the drawings, it is to be understood that without departing from the essence of the present invention there may be more than two such horizontally extending rows. Each such horizontally extending row is designed so as to contain as many separators as may be desired, and so as to be dependent upon the size and the capacity of the drum 112. The steam separators 124 are mounted so as to be suitably positioned over the apertures 125 in the baffle ledge portions 122 such as to thereby be operative to direct the flow of the steam-water mixture from the riser pipes 114 into the annular space 116, and then therefrom up through the apertures 125 in the baffle ledge portions 122 and into the interior of the separators 124.

Figure 2:
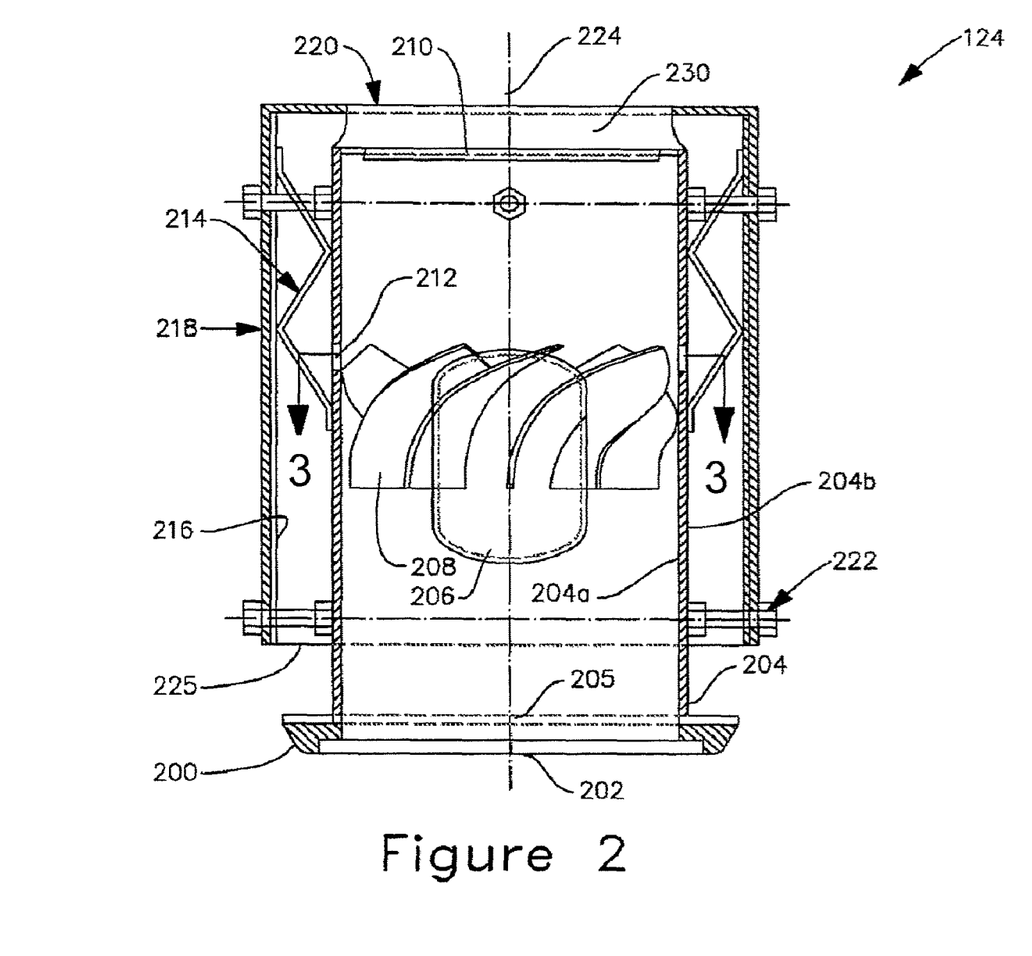
FIG. 2 is a cross sectional view of the separator illustrated in FIG. 1, constructed in accordance with the present invention.

Referring now to FIG. 2 of the drawings, each of the separators 124 in accordance with the present invention includes a base 200, depicted as comprising a cast steel support ring, which is provided with an inlet 202 for purposes of receiving a steam-water mixture flow therein. Continuing with the description thereof, a spinner chamber 204, which is depicted as comprising a cylindrical pipe, is welded on top of the base 200 and is provided with an inlet opening 205 for receiving the steam-water mixture flow from the base 200, with an outlet opening 210 and with a passageway, the latter being formed by the inner surface 204a of the peripheral wall of the chamber 204.

With further regard thereto, contained within the chamber 204 is comprised of a core 206, which is a cylindrical member that is provided with domed top and bottom ends. The latter bottom domed end is suitably provided with a hole for pressure equalization purposes. Suitably positioned within the annular space between the core 206 and the chamber 204 are a plurality of spinner blades 208. This plurality of spinner blades 208 is each welded both to the core 206 and to the chamber 204 so as to thereby form a unitary spinner unit. The profiles and the discharge angles of each of the spinner blades 208 are designed to be optimized in order to thereby enhance the centrifugal motion of the steam/water mixture flow that is received at the inlet opening 205 of the spinner chamber 204. The profile and discharge angle that each of the plurality of spinner blades 208 is made to embody depends upon the composition and thermo-physical properties of the vapor-liquid mixture that is designed to be separated therewith. Although the details of the profile and discharge angle that each of the plurality of spinner blades 208 embodies may vary insofar as any specific situation is concerned, the shapes of the individual spinner blades 208 that been selected for illustration herein in the drawings insofar as the spinner housing and blade configuration thereof are concerned are only by way of exemplification and not limitation and as such the present invention is not limited to any of the specific dimensions or angles that have been illustrated in the drawings for the spinner blades 208. Preferably, the number of spinner blades 208 in accordance with the preferred embodiment of the present invention exceeds 4, although this number of spinner blades 208 may equally well be increased or decreased without departing from the essence of the present invention. In the particular application of the present invention that is being described, 10 spinner blades 208 were found to work very well for purposes of the present invention.

Continuing with the description of the present invention, the flow through the plurality of spinner blades 208 of the steam-water mixture that is received thereby is designed to induce the steam-water mixture flow that is received thereby to spin about the longitudinal axis 224 of the passageway that is formed by the inner surface 204a of the peripheral wall of the chamber 204, such as to thereby impart a centrifugal motion to such steam-water mixture flow. This centrifugal motion in turn causes droplets of liquid in such steam-water mixture flow to be forced against the inner surface 204a of the separator housing 204, and concomitantly to cause the vapor to move to the center of the chamber 204, thereby effectively effecting a separation of the water from such steam-water mixture flow.

After being made to pass through the spinner blades 208, the steam-water mixture flow from which at least some of the water has been separated therefrom by virtue of the passage of the steam-water mixture through the spinner blades 208 is made to flow through the passageway that is suitably formed by the inner surface 204a of the peripheral wall of the chamber 204, and thereafter is made to spiral up through the outlet opening 210 of the chamber 204. On the other hand, a flow of droplets of water, which are forced against the inner surface 204a of the peripheral wall of the chamber 204, is made to spiral up along the inner surface 204a of the peripheral wall of the chamber 204 and then through a series of slots 212 that are suitably formed around the circumference of the peripheral wall of the chamber 204.

Figure 3:
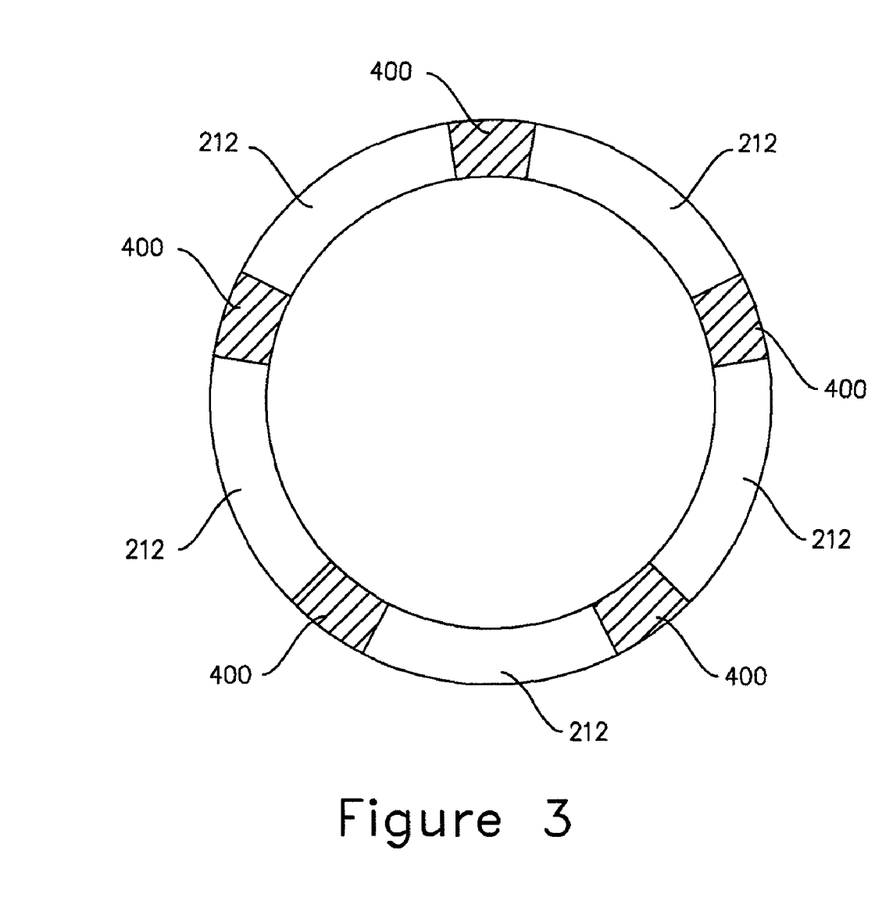
FIG. 3 is a plan view of the chamber of the separator illustrated in FIG. 2 taken through the slot thereof, constructed in accordance with the present invention.

Referring next to FIG. 3 of the drawings, there is depicted therein a cross-section, taken at the line 3-3 in FIG. 2, of the chamber 204 wherein the series of slots 212 is illustrated. Continuing with the description thereof the slots 212 of the series of slots 212 are each suitably separated by the segments 400 of the peripheral wall of the chamber 204. In accordance with the specific embodiment of the present invention that is presently being described herein, five such slots 212 are preferably provided, such that each of which has a length of 4.25-4.26 inches and a height of 0.13 inches, although without departing from the essence of the present invention the number and size of the slots 212 may be made to vary depending on the nature of the particular application in which the present invention is being employed. As illustrated in FIG. 2 of the drawings, each of the segments 400 of the peripheral wall of the chamber 204 that are designed to effect the separation of adjacent slots 212 preferably is approximately 1.0 inch in length, although this too without departing from the essence of the present invention may also be made to vary depending on the nature of the particular application in which the present invention is being employed. It will be readily apparent to those skilled in the art that although all of the slots 212 are depicted as extending horizontally, although other arrangements thereof could equally well be employed in lieu thereof without departing from the essence of the present invention. To this end, the slots 212 could, if so desired, be oriented in some other way without departing from the essence of the present invention. In addition, it is also not required in accordance with the present invention that all of the slots 212 be oriented in the same way or even be of the same size and/or shape. By way of exemplification and not limitation in this regard, if so desired a single continuous slot 212, which extends around the entire circumference of the chamber 204 could be employed without departing from the essence of the present invention, in which case the portion of the chamber 204 that is positioned above the slot 212 would need to be separately supported, since the upper portion of the chamber 204 would not in such a case be supported by the segments 400 of the peripheral wall, which are illustrated in FIG. 3. However, irrespective of the size, shape, orientation and number of slots 212 that are employed, the slot(s) 212 are required in accordance with the present invention to be located above the spinner blades 208.

Referring again to FIG. 2 of the drawings, as best understood with reference thereto a series of meshes 214, 216 and 218 are suitably provided outside of the chamber 204. The nature of the construction and of the mode of operation of the series of meshes 214, 216 and 218 may be made to vary depending on the nature of the particular application in which the present invention is being employed.

Figure 4:
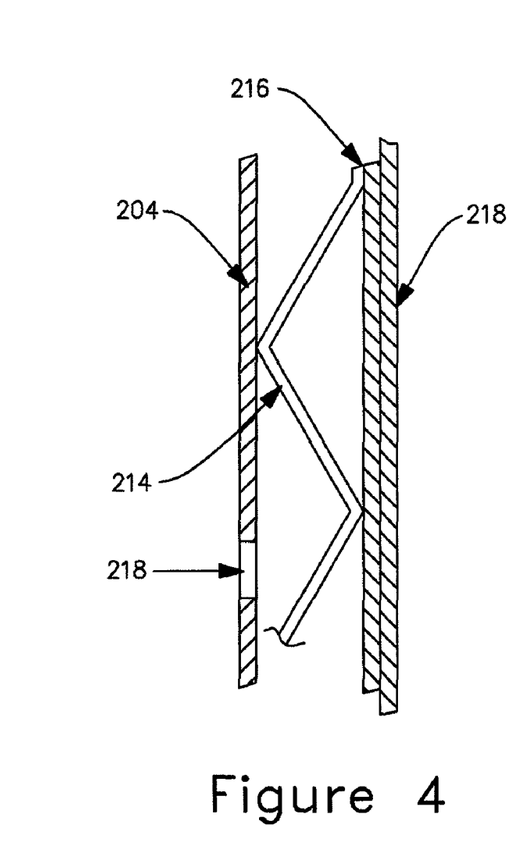
FIG. 4 is an enlarged view of the portion of the chamber wall embodying the slot and the screens of the separator, which is illustrated in FIG. 2, constructed in accordance with the present invention.

In FIG. 4 of the drawings, there is illustrated an enlarged view of a section of the separator 124, which includes a portion of the wall of the chamber 204 that embodies the slot 212, as well as a portion of each of the meshes 214, 216 and 218. With further reference to FIG. 2 and FIG. 4 of the drawings, in accordance with the specific embodiment of the present invention that is presently being described herein, the mesh 214, which sometimes in the industry is referred to as a filler, preferably comprises a No. 8 mesh metal screen for which 0.047 diameter wire is employed. The mesh 214 is suitably positioned so as to be located in the path of the droplets of water that are made to flow through the slot 212. In the specific embodiment of the present invention that is being described herein, the mesh 214 embodies a cylindrical shape and is designed so as to be operative to surround the chamber 204. To this end, the wall of the mesh 214 is suitably designed so as to thereby define a compartment that extends longitudinally between the opposite ends of the mesh 214, such that the chamber 204 is suitably disposed within this compartment. As best understood with reference to FIG. 2 of the drawings, the longitudinal axis 224 of the passageway that is formed by the inner surface 204a of the chamber 204 is also designed to function as the longitudinal axis of the aforementioned compartment, although other arrangements thereof could equally well be employed in lieu thereof without departing from the essence of the present invention.

Continuing with the description thereof, the mesh 214 preferably is suitably provided with two creases or crimps such that each of which lies in a plane that extends substantially orthogonal to the longitudinal axis 224 of the passageway that is formed by the inner surface 204a of the chamber 204. These creases with which the mesh 214 is suitably provided are designed to be operative to cause the mesh 214 to have an accordion-like shape as viewed with reference to the longitudinal direction of the mesh 214. These creases are also operative to cause the individual sections of the mesh 214, which are positioned between the creases to be cone-shaped when viewed with reference to an elevation view thereof as best illustrated with reference to FIG. 2 and FIG. 4 of the drawings.

Continuing, the droplets of water that are made to flow through the slots 212 in doing so are caused to contact the mesh 214 at a high velocity. To this end, the force of the contact between the droplets of water that flow from the slots 212 and that make contact with the mesh 214 is operative to cause the coalesced steam bubbles that remain entrained in the water to disengage from the droplets of water and to travel upwardly through the mesh 214 such as to thereby continue to flow in an upwardly direction between the mesh 216 and the outer surface 204b of the peripheral wall of the chamber 204. In addition, such contact thereof is also operative to reduce the velocity of the droplets of water that are made to flow from the slots 212, and as such is also operative to diminish the amount of steam carry that is entrained in such flow of the droplets of water.

With further regard thereto, some of the droplets in the water that flows from the slots 212 are designed both to be captured by the mesh 214 and to be made to travel in a downwardly direction along the mesh 214 to an outlet opening 225 that is suitably provided for this purpose and from the outlet opening 225 back to the pool of liquid that is present in the bottom of the drum 112. However, other ones of the droplets of water in the flow thereof from the slots 212 are made to pass through the mesh 214 and as such are caused to make contact with the mesh 216.

In accordance with the specific embodiment of the present invention that is presently being described herein, the mesh 216, which sometimes in the industry is referred to as an inner jacket, preferably comprises a 6 Gage mesh metal screen. To this end, the mesh 216 is designed to be suitably located in the path of the droplets of water that are made to pass through the mesh 214. In the specific embodiment of the present invention that presently is being described herein, the mesh 216 embodies a cylindrical shape and is designed so as to be operative to surround the mesh 214. To this end, the mesh 216 is provided with a mesh wall that is operative to define another, i.e., or a second, compartment that extends longitudinally between the opposite ends of the mesh 216, such that the mesh 214 is suitably disposed within this compartment. As best understood with reference to FIG. 2 of the drawings, the longitudinal axis 224 of the passageway that is formed by the inner surface 204a of the chamber 204 is also designed to function as the longitudinal axis of the another, i.e., or the second, compartment that is formed by the mesh 216.

Continuing with the description thereof, the flow of droplets of water that is made to pass through the mesh 214 tends to be caused to be thrown against the mesh 216. To this end, such impact with the mesh 214 of the droplets of water is also operative to effect a release from the flow of droplets of water reaching the mesh 216 of vapor that is entrained therewith. Moreover, contact with the mesh 216 of the flow of the droplets of water is designed to be operative to further reduce the velocity of the flow of the droplets of water, which in turn is designed to be operative to effect a reduction in the amount of re-entrainment of vapor into the droplets of water. With further regard thereto such vapor that is so released is then made to flow in an upwardly direction outside of the outer surface 204b of the peripheral wall of the chamber 204.

Some of the droplets of water in the flow thereof from the mesh 214 are designed both to be captured by the mesh 216, and to be made to travel in a downwardly direction along the mesh 216 to the outlet opening 225 that is suitably provided for this purpose and from the outlet opening 225 back to the pool of liquid that is present in the bottom of the drum 112. However, other ones of the droplets of water in the flow thereof are made to pass through the mesh 216 and as such are caused to make contact with the mesh 218.

In accordance with the specific embodiment of the present invention that is presently being described herein, the mesh 218, which sometimes in the industry is referred to as an outer jacket, preferably comprises a 0.5 inch by No. 13 expanded metal screen. To this end, the mesh 218 is designed to be suitably located in the path of the droplets of water that are made to pass through the mesh 216. In the specific embodiment of the present invention that is presently being described herein, the mesh 218 embodies a cylindrical shape and is designed so as to be operative to surround the mesh 216. To this end, the mesh 218 embodies a mesh wall that is operative to define a third compartment that extends longitudinally between the opposite ends of the third mesh 218, such that the mesh 216 is suitably disposed within this third compartment. As best understood with reference to FIG. 2 of the drawings, in this case also the longitudinal axis 224 of the passageway that is formed by the inner surface 204a of the chamber 204 is also designed to function as the longitudinal axis of the third compartment, the latter being formed by the mesh 218.

Continuing with the description thereof, the flow of droplets of water that is made to pass through the mesh 216 tends to be caused to be thrown against the mesh 218. To this end, such impact with the mesh 218 of the droplets of water is also operative to effect a release from the flow of the droplets of water that reaches the mesh 218 a still further amount of the vapor that is still entrained therewith. Moreover, contact with the mesh 218 of the flow of the droplets of water is designed to be operative to further reduce the velocity of the flow of the droplets of water, which in turn is designed to be operative to effect a reduction in the amount of re-entrainment of vapor into the droplets of water. With further regard thereto such vapor that is so reduced is then made to flow in an upwardly direction outside of the outer surface 204b of the peripheral wall of the chamber 204.

An advantageous characterization thereof is that, virtually all, if not all, of the droplets in the flow of water that is made to pass through the mesh 216 will also both be captured by the mesh 218, and will be made to travel in a downwardly direction along the mesh 218 to the outlet opening 225 that is suitably provided for this purpose and from the outlet opening 225 back to the pool of liquid that is present in the bottom of the drum 112.

Continuing, the vapor that has been separated from the flows of droplets of water that are caused to make contact with the meshes 214, 216 and 218, respectively, are as a result thereof made to flow in an upwardly direction to a steam collection nozzle 230. To this end, the steam collection nozzle 230 preferably embodies the shape of a "donut", such as to thereby have an open center that is operative to form the outlet opening 220 through which the steam-water mixture that after being subjected to the removal of vapor therefrom is suitably exhausted from the outlet opening 210 of the chamber 204 so as to then be released back into the drum 112. Continuing, the vapor that is collected in the collection nozzle 230 is also released back into the drum 112 through one or more nozzle orifices of conventional construction that are suitably provided for this purpose. The collection nozzle 230 is capable of being designed in accordance with the use of any well-known techniques such as to thereby be operative to enhance the flow distribution of vapor back into the drum 112, although other arrangements thereof could equally well be employed without departing from the essence of the present invention.

The steam-water mixture, after having been subjected to the removal of vapor therefrom, that flows from the tops of the separators 24 is made to enter the space for the vapor that is located around and above the separators 24, and is then made to flow in an upwardly direction toward the steam outlet 82, which can be found illustrated in FIG. 1. An advantageous characterization thereof is that located between the separators 24 and the steam outlet 82 is the final steam dryer, the latter being generally designated by the reference numeral 84 in the drawings. With further regard thereto, the final steam dryer 84 may without departing from the essence of the present invention be made to embody any type of conventional construction, including but not limited to, any conventional form of steam dryer. Since final steam dryers 84 have been in use for many years and are well understood by those skilled in this art, it is not deemed to be necessary that the specific details regarding the nature of the construction and the mode of operation of the final steam dryer be described and/or illustrated herein.

In accordance with the description thereof above, a new and improved separation technology is thus provided in accordance with the present invention that is designed to be operative for purposes of effecting therewith the separation from liquids of vapors that are entrained in two-phase fluid mixtures, such as, by way of exemplification and not limitation, steam from water in the steam drum of a steam generating system.

While an embodiment(s) of our invention have been described, it will be readily appreciated by those skilled in the art that modifications thereof, some of which have been alluded to hereinabove, may still be readily made thereto by those skilled in the art without departing from the essence of the present invention. It is therefore intended by the appended claims to cover all such modifications that have been alluded to herein as well as any and all of the other modifications that may fall within the true spirit and scope of our invention.

I claim:

1. A vapor-liquid separator, comprising:
   a chamber having (i) an inlet opening operative for purposes of receiving there at a flow of a vapor-liquid mixture, (ii) an outlet opening operative for purposes of exhausting therethrough said vapor-liquid mixture, (iii) a wall, including a smooth, curved inner surface and an outer surface, said inner surface being operative to define a cylindrical passageway that extends longitudinally between said inlet opening and said outlet opening, and (iv) a slot suitably formed through both said inner surface and said outer surface of said wall; and
   a plurality of spinner blades suitably disposed within said passageway so as to be positioned below said slot, and suitably configured so as to be operative to induce the flow of said vapor-water mixture to spin, such as to thereby centrifugally force droplets of liquid that are entrained in the flow of said vapor-liquid mixture that is spinning up against said inner surface of said wall and then through said slot; and
   wherein said passageway is suitably configured so as to be operative to direct the flow of said vapor-liquid mixture to said outlet opening, and
   wherein the wall is continuous above the slot.

2. The vapor-liquid separator as claimed in claim 1 wherein:
   said slot extends along a circumference of said wall at a single longitudinal position along the passageway.

3. The vapor-liquid separator as claimed in claim 1 wherein:
   said slot is one of a series of adjacent slots, each of said series of adjacent slots being formed through said inner surface and through said outer surface of said wall at a single longitudinal position along the passageway.

4. The vapor-liquid separator as claimed in claim 1 wherein:
   said plurality of spinner blades are suitably disposed approximately midway between said inlet opening and said outlet opening.

5. The vapor-liquid separator as claimed in claim 1 further comprising:
   a mesh suitably located outside said chamber such as to be disposed in the path of flow of said droplets of liquid in said vapor-liquid mixture that are made to flow through said slot.

6. The vapor-liquid separator as claimed in claim 5 wherein:
   said mesh is a creased mesh having a crease that extends in a plane that is substantially orthogonal to a longitudinal axis of said passageway.

7. The vapor-liquid separator as claimed in claim 5 wherein:
   said mesh has (i) a first end, (ii) a second end, and (iii) a mesh wall that is operative to define a compartment that extends longitudinally between said first end and said second end;
   said chamber is suitably disposed within said compartment; and
   the longitudinal axis of said passageway also functions as the longitudinal axis of said compartment.

8. The vapor-liquid separator as claimed in claim 5 wherein said mesh is a first mesh, and further comprising:
   a second mesh that is suitably located outside said chamber so as to be suitably disposed in the path of flow of said droplets of liquid in said vapor-liquid mixture that are made to pass through said first mesh.

9. The vapor-liquid separator as claimed in claim 8 wherein:
   said first mesh has (i) a first end, (ii) a second end, and (iii) a mesh wall that is operative to define a first compartment that extends longitudinally between said first end and said second end;
   said second mesh has (i) a first end, (ii) a second end, and (iii) a mesh wall that is operative to define a second compartment that extends longitudinally between said first end and said second end;
   said chamber is suitably disposed within said first compartment;
   said first mesh is suitably disposed within said second compartment; and
   the longitudinal axis of said passageway also functions as the longitudinal axis of each of said first compartment and of said second compartment.

10. The vapor-liquid separator as claimed in claim 8 further comprising:
    a third mesh that is suitably located outside of said chamber so as to be suitably disposed in the path of flow of said droplets of liquid in said vapor-liquid mixture that are made to pass through said second mesh.

11. The vapor-liquid separator as claimed in claim 10 wherein:
    said first mesh has (i) a first end, (ii) a second end, and (iii) a mesh wall that is operative to define a first compartment that extends longitudinally between said first end and said second end;
    said second mesh has (i) a first end, (ii) a second end, and (iii) a mesh wall that is operative to define a second compartment that extends longitudinally between said first end and said second end;
    said third mesh has (i) a first end, (ii) a second end, and (iii) a mesh wall that is operative to define a third compartment that extends longitudinally between said first end and said second end;
    said chamber is suitably disposed within said first compartment;
    said first mesh is suitably disposed within said second compartment;
    said second mesh is suitably disposed within said third compartment; and
    the longitudinal axis of said passageway also functions as the longitudinal axis of each of said first compartment, of said second compartment, and of said third compartment.

12. The vapor-liquid separator as claimed in claim 1 wherein:
    the vapor in said vapor-liquid mixture is steam and the liquid in said vapor-liquid mixture is water.

13. A method operative for purposes of effecting therewith the separation of liquid from a vapor-liquid mixture that is made to flow in a cylindrical passageway from an inlet to an outlet, and wherein the passageway is defined by a peripheral wall being a curved surface that has a through slot provided therein, wherein the wall is continuous above the slot, the method comprising:
- receiving at the inlet of the passageway a flow of a vapor-liquid mixture;
- applying a centrifugal force to cause droplets of the liquid in the vapor-liquid mixture that is received at the inlet of the passageway to flow through the through slot in the peripheral wall; and
- exhausting from the outlet of the passageway the flow of vapor-liquid mixture after droplets of liquid have been removed therefrom.

14. The method as claimed in claim 13 further comprising:
- screening the droplets of liquid that are made to flow through the slot.

15. The method as claimed in claim 14 further comprising:
- screening again at least a portion of the droplets of liquid that have already been subjected to screening.

16. The method as claimed in claim 15 further comprising:
- screening still again at least a portion of the droplets of liquid that have already again been subjected to screening.

17. The method as claimed in claim 13 wherein:
the vapor in the vapor-liquid mixture is steam and the liquid in the vapor-liquid mixture is water.

18. A vapor-liquid separator comprising:
- a cylindrical chamber having (i) an inlet opening, (ii) an outlet opening, (iii) a wall, including an inner surface and an outer surface, said inner surface being operative to define a cylindrical passageway that extends longitudinally between said inlet opening and said outlet opening, and (iv) a series of adjacent slots all at a single longitudinal location along a longitudinal axis passing through the center of the passageway suitably formed so as to extend along a circumference through both said inner surface and said outer surface of said wall of said chamber, wherein the wall is continuous above the adjacent slots;
- a plurality of spinner blades suitably disposed within said passageway so as to be positioned below said slot;
- a first mesh having (i) a first end, (ii) a second end, and (iii) a mesh wall that is operative to define a compartment (a) that extends longitudinally between said first end and said second end and (b) having said cylindrical chamber disposed therein;
- a second mesh having (i) a first end, (ii) a second end, and (iii) a mesh wall that is operative to define a second compartment (a) that extends longitudinally between said first end and said second end and (b) having said first mesh disposed therein; and
- a third mesh having (i) a first end, (ii) a second end, and (iii) a mesh wall that is operative to define a third compartment (a) that extends longitudinally between said first end and said second end and (b) having said second mesh disposed therein.

19. The vapor-liquid separator as claimed in claim 18 wherein:
said mesh wall of said first mesh includes a crease that extends in a plane that is substantially orthogonal to the longitudinal axis of said passageway.

20. The vapor-liquid separator as claimed in claim 18 wherein:
said passageway, said first compartment, said second compartment, and said third compartment each have the same longitudinal axis.

* * * * *

UNITED STATES PATENT AND TRADEMARK OFFICE
CERTIFICATE OF CORRECTION

| | | |
|---|---|---|
| PATENT NO. | : 7,896,937 B2 | Page 1 of 1 |
| APPLICATION NO. | : 12/127846 | |
| DATED | : March 1, 2011 | |
| INVENTOR(S) | : Lorraine S. Miemiec | |

It is certified that error appears in the above-identified patent and that said Letters Patent is hereby corrected as shown below:

Column 1, lines 44-45 the word "coalescers" should read --coalesces--.

Column 10, lines 51, 52, and 56, for the claim reference numeral "24", each occurrence, should read --124--;

Column 10, lines 53 and 56, for the claim reference "82", each occurrence, should read --182--;

Column 10, lines 57, 58 and 62, for the claim reference "84", each occurrence, should read --184--.

Signed and Sealed this
Twenty-fourth Day of January, 2012

David J. Kappos
*Director of the United States Patent and Trademark Office*